Oct. 21, 1969  H. R. SMITH, JR  3,474,218
ELECTRON BEAM CONDITIONING INGOT AND SLAB SURFACES
Filed Jan. 10, 1966  2 Sheets-Sheet 1

INVENTOR.
HUGH R. SMITH JR.

BY Anderson, Luedeka, Fitch, Even, & Tabin
ATTORNEYS

Oct. 21, 1969
H. R. SMITH, JR
3,474,218
ELECTRON BEAM CONDITIONING INGOT AND SLAB SURFACES
Filed Jan. 10, 1966
2 Sheets-Sheet 2
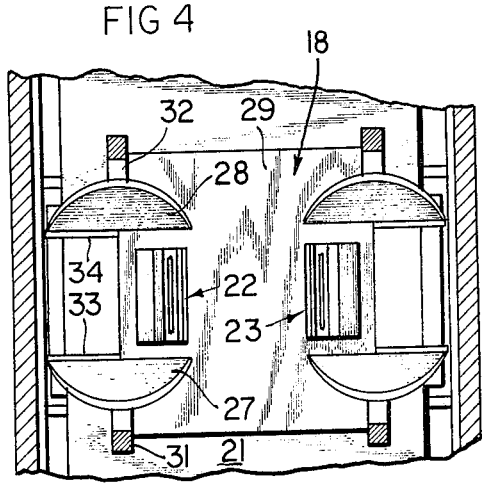
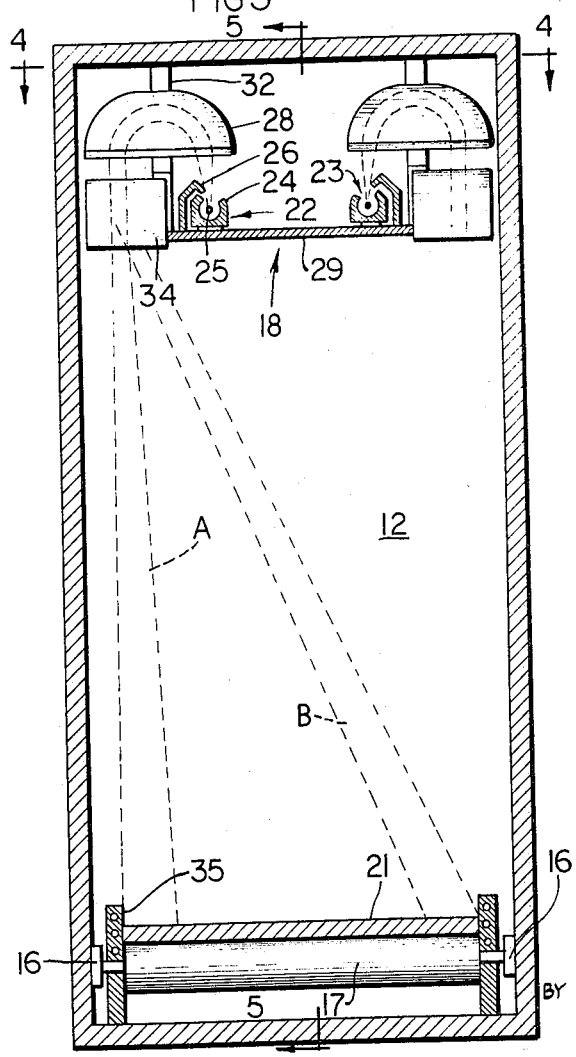
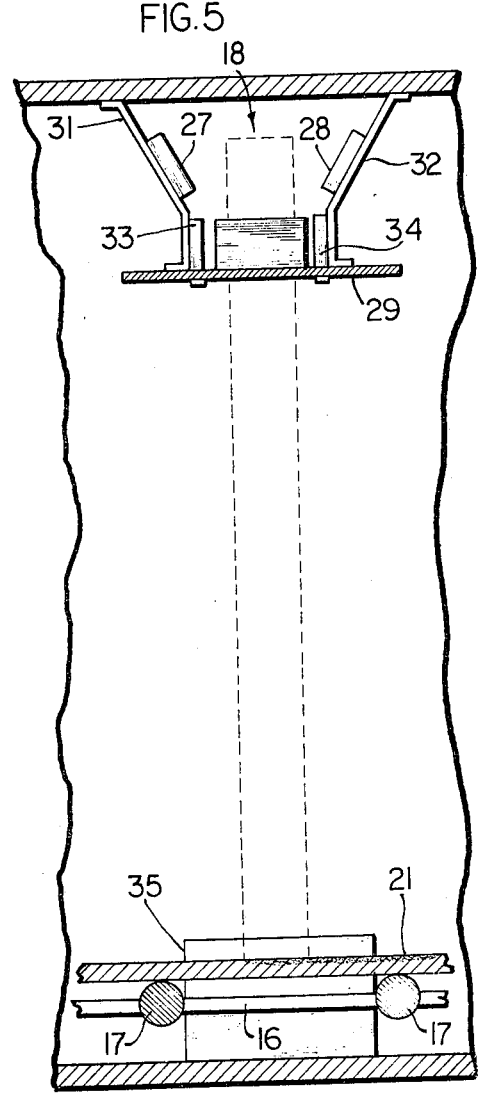
HUGH R. SMITH JR
BY Anderson, Luedeka, Fitch, Even, & Tabin United States Patent Office 3,474,218
Patented Oct. 21, 1969

3,474,218
ELECTRON BEAM CONDITIONING INGOT AND SLAB SURFACES
Hugh R. Smith, Jr., Piedmont, Calif., assignor, by mesne assignments, to Air Reduction Company, Incorporated, a corporation of New York
Filed Jan. 10, 1966, Ser. No. 519,592
Int. Cl. H05b 7/18
U.S. Cl. 219—121                    3 Claims

ABSTRACT OF THE DISCLOSURE

The conditioning of the surfaces of ingots and slabs utilizing electron beams is described. A slab or ingot is passed into an evacuated environment in which at least one beam of electrons is directed against the top surface. The beam melts a portion of the object at the surface thereof to a predetermined depth and the surfaces solidify in a controlled manner to produce a layer which is free of surface and subsurface defects.

---

This invention relates to the manufacture of metal objects and, more particularly, to the conditioning of the surface of solid metal objects to eliminate existing surface and subsurface imperfections.

Under some circumstances, it may be necessary or desirable to eliminate existing surface and subsurface defects on solid metal objects. For example, subsequent forming operations may require the removal of imperfections or flaws often found in and near the surface of cast or wrought metal objects as a result of the casting or working operation. Some of such imperfections or flaws are known in the art as hot tears, inclusions, cold shuts, gas bubbles, porosity, and surface laps. Such forming operations may be, for example, hot and cold rolling and forging.

Various methods have been utilized in order to remove defects from the surface of solid metal objects. Many of these methods, including grinding, cutting by means of a shaper or lathe, and flame scarfing, involve the removal of substantial amounts of material. This lowers the production yield and increases the manufacturing cost. Surface conditioning by utilizing an electric arc similar to a welding arc, although not resulting in much loss of material, has been found to produce a surface which is not smooth enough for many applications due to variations in energy density in the arc as it traverses the metal surface and also due to improper solidification patterns which result in surface cracks and porosity.

The requirement for the elimination of surface defects in solid metal objects, particularly castings and wrought slabs, has consequently necessitated costly and time consuming operations. For example, continuous casting apparatus has been utilized to provide an integrated source of slab material to be fed directly in production lines to rolling mills. It has been found in such continuous casting apparatus that the surface quality of the continuous cast slabs is such that as much as one-quarter inch of the surface must be removed, either through grinding or flame scarfing, before the slab may proceed to the rolling mill. Additional spot conditioning is frequently necessary. Not only does this represent a substantial loss of material, but the operation is time consuming and breaks up the production flow.

It is an object of this invention to provide a surface conditioning method for solid metal objects which results in a surface of a quality not attainable with previously known methods and which is readily incorporated in high production rate operations.

Another object of the invention is to provide an improved method for removing existing surface defects, such as hot tears, inclusions, cold shuts, and surface laps, gas bubbles, and porosity, from the surface of solid metal objects, wherein the loss of material is negligible and wherein the resultant conditioned surface is of a uniform and controlled depth.

Other objects and the various features of the invention will become apparent to those skilled in the art from the following description taken in connection with the accompanying drawings, wherein:

FIGURE 3 is an enlarged sectional view taken along the line 3—3 of FIGURE 1;

FIGURE 4 is a sectional plan view taken along the line 4—4 of FIGURE 3; and

FIGURE 5 is a sectional view taken along the line 5—5 of FIGURE 3.

Figure 1:
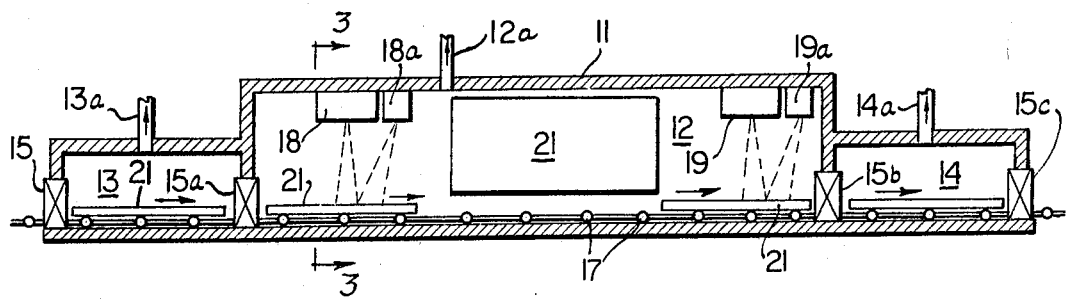
FIGURE 1 is a side elevational view in full section (partially schematic) of one form of apparatus constructed for practicing the method of the invention.

The invention provides a method for conditioning a surface of a solid metal object to eliminate defects existing in and near the surface thereof. The object is first passed into an evacuated environment. A beam of electrons is directed against the surface of the object in the evacuated environment. The power and density of the beam of electrons is controlled to melt a portion of the object at the surface thereof to a predetermined depth without causing excessive vaporization of the molten metal. The melted portion of the object is subsequently permitted to cool and solidify under controlled conditions to provide an object that is free from surface imperfections.

To avoid porosity resulting from improper solidification patterns following the melting operation, the molten metal must not be allowed to form a solid skin while any molten metal is present underneath the skin. In other words the solidification must be unidirectional upward. Application of the proper amount of controlled heat to the surface of metal in the solidfication zone will prevent undesirable solidification patterns. This procedure is known as "hot-topping." In some situations the heat transfer characteristics of the molten metal are such that hot-topping is not necessary for proper solidification. Where hot-topping is required, this heat may be conveniently provided by electron beams from subsidiary guns. In accordance with a preferred form of the invention, the object may be moved with respect to the electron beams, or the electron beams may be swept along or across the object, or all or some of these movements may be performed simultaneously.

In accordance with the method of the invention, a molten zone is produced on the surface to be conditioned. This molten zone may cover the entire surface to be conditioned or only part of such surface. The depth, temperature and width of the molten zone are controlled and depend upon the size and material of the object, the surface of which is being conditioned and upon the subsequent operations to be performed on the object. For relatively large surfaces, the zone may be traversed along the surface being conditioned. The method is performed in a high vacuum of the order of one millitorr or less, and the molten zone is produced and controlled by directing a beam or beams of electrons of controlled power and density against the surface of the object in the evacuated environment. To produce a moving molten zone the beam and the object are moved relative to each other. Some surfaces may be small enough with respect to the target area of the electron beam or beams that relative movement between the beams and the object is unnecessary. In such instances the entire surface may be heated at one time. It would probably be necessary to provide cooled side rails or similar means on all sides of the object for confining the molten surface of the object, although under certain conditions the surface tension phenomenon may eliminate the need for side rails. Where side rails are used the electron beam power density in the vicinity of the side rails must be increased to compensate for the heat transfer to the side rails. As an alternative a small unmelted band may be left around the periphery of the surface being conditioned by appropriate regulation of the size of the electron beam target area.

The melting and controlled solidifying of the surface of the object in accordance with the present invention provides a finite depth of conditioned metal on the surface of the object. As previously described controlled solidification generally requires hot-topping procedures. When the object is formed in a subsequent forming operation the conditioned layer forms the outer skin of the formed object and hides defects and imperfections in the interior of the object. This is particularly important, for example, when a thick metal slab is rolled in a rolling mill to reduce its thickness from, for example, 6 inches to 0.002 inch.

In the case of vacuum cast slabs, such as those produced in electron beam furnaces designed for cold mold continuous casting, the conditioning operation can be performed before the ingot has been removed from the vacuum system in which it has been cast. Such an operation would have particular advantage in the production of titanium and zirconium slabs or other metal slabs in which surface oxidation followed by electron beam surface conditioning results in contamination of the melt due to the solubility of nonvolatile oxides in the parent metal. By performing electron beam conditioning prior to removal and exposure of the freshly cast slab or ingot to the atmosphere, and while the ingot is still hot, this contamination is avoided. In the production of ingots or slabs of iron, nickel and cobalt alloys and others which do not absorb oxygen but rather only form an oxide scale upon hot exposure to air, the electron beam conditioning of the oxidized surface does not contaminate the metal. Consequently, it would be satisfactory, in this latter case, that the slabs or ingots be exposed to air prior to the electron beam conditioning step.

In the case of surface conditioning of slabs and ingots that contain no insoluble impurities, generally referred to as inclusions, the required minimum depth of melting is that required to smooth out surface irregularities and adequately heal surface tears and imperfections. The surfaces of ingots and slabs produced in electron beam melting and casting furnaces are typically of this quality. Depth of molten zone requirements to condition such surfaces would ordinarily be between about $\frac{1}{16}$ inch and about $\frac{1}{4}$ inch on each major surface, depending upon production conditions.

Mild steel slabs are subject to substantial surface scaling losses during hot-rolling operations. In surface conditioning mild steel slabs which are to be hot-rolled, the minimum required depth of melting is the sum of the maximum possible scaling loss plus the required depth of conditioned material that will provide suitable coverage of flaws in the body of the metal after it is rolled down to the desired thickness. The depth of molten zone required with such objects would ordinarily be between about $\frac{1}{4}$ inch and about $\frac{5}{8}$ inch on each major surface of the slab, depending upon production conditions.

In the case of continuously cast stainless steel slabs, the healing of surface laps and hot tears may ordinarily be accomplished by utilizing molten zone depths in the range between about $\frac{1}{16}$ inch and about $\frac{1}{4}$ inch.

In some operations it may be necessary to condition minor surfaces of the object, such as the edges of slabs. Since such surfaces are relatively small, material losses may be of minor importance and the conditioning of the edges may be accomplished by "scarfing" of the edges with an intense electron beam.

The advantages accruing from the invention are considerable. The electron beam power intensity is readily controlled by means known in the art; consequently the characteristics of the melting zone and the solidification patterns may be closely controlled to provide the desired surface. The invention is adaptable to systems wherein the material to be conditioned is fed semi-continuously or continuously into the system and through it. In the event the choice of power density of the electron beams is improper, and improper surface conditioning results, the operation is readily repeated. There is a negligible loss of material during the operation, and apparatus for performing the operation may be constructed to accommodate a wide variety of object shapes.

The power required to effect the desired surface melting will depend upon the surface area to be melted, the desired depth of the melt, the required solidification patterns, the thermal properties of the metal, the relative speed of the melt area with respect to the remainder of the metal object, if any, and the amount the object is preheated, if any.

Since power is a measure of an amount of energy per unit of time, efficiency considerations would indicate that it is theoretically desirable to perform the surface melting operation as rapidly as possible to minimize the total energy used. Naturally, speed is also desirable in mass production situations. In actual commercial practice where rolling operations are to be performed, however, a substantial depth of melted material will generally be required in order that the conditioned skin which is free of imperfections and flaws be of sufficient thickness to mask internal irregularities in the body of the metal after it has been rolled down to a desired thickness. In the manufacture of sheet metal, such thickness may be of the order of .002 to .035 inch. Thus the energy which must be put into the surface of the metal object must not only heat the metal at the surface of the object, but must heat the metal to produce melting down to the specified depth of the conditioned surface desired.

It has been found that a practical maximum limit exists on the amount of energy which may be put into the surface of the metal object being conditioned per unit of time. As the electron beam power intensity at the surface of the object increases, relatively larger amounts of metal vaporize, causing some loss of material and further increasing the likelihood of fouling and clogging of the various apparatus in the furnace by heavy coatings of metal due to condensation of the vapor on the apparatus. Thus, although it is desirable to provide sufficient power to cause melting to the depth required while minimizing slab residence time within the electron beam bombardment zone, the effect of vaporization of the metal may significantly limit the power which may be used. In the conditioning of slabs of iron, nickel and cobalt base alloys, the practical upper limit is generally in the range of 300 to 1,000 kilowatts of electron beam heating power per square foot of slab surface. This intensity is the average value measured over a period of, for example, 100 milliseconds, in the case of oscillating beams as subsequently described. For tantalum, this practical limit is in the range of about 3,000 to about 5,000 kilowatts per square foot of slab surface. For columbium it is approximately 1,500 to 3,000 kilowatts per square foot of slab surface, and for titanium the limit is approximately 600 to 1500 kilowatts per square foot of slab surface. The exact value of an upper power limit cannot be specified precisely for any particular material because the amount of metal vaporization that can be tolerated depends upon the configuration of the electron beam heating system and upon the composition of the object and the monetary value of the material in the object. In the appended claims, the term "excessive vaporization" is used. This is meant to indicate that amount of vaporization which is of such a magnitude that it exceeds what can be tolerated for the particular heating system and material involved.

The minimum power required for satisfactory operation depends upon the acceptable productivity level. For example, a power intensity of about 20 kilowatts per square foot on steel or nickel alloy slabs previously heated to about 1500° F. is sufficient to provide a molten depth of about ¼" at a relative rate of motion of the slab to the beam of about 3 inches per minute. Such a melt depth and relative speed might be perfectly acceptable in nickel alloy production and similar operations, yet would be much too slow for the production of a material such as slabs for rolling into auto body sheet metal. As a general rule, increasing the time spent melting for a given depth necessitates decreasing the power intensity and results in an increase in the total power used. Theoretically, the minimum power intensity required to provide a given melting depth is that which provides total heating power to overcome thermal losses in the system with barely sufficient excess power to perform the conditioning operation at an infinitely slow rate.

In FIGURE 1, one form of apparatus for accomplishing the method of the invention is shown. The apparatus is shown in connection with the processing of metal slabs of finite length. It is to be understood that this apparatus is merely one form of apparatus for performing the invention and that other types of apparatus could be constructed for performing the invention with respect to particular objects of different configuration. For example, such particular objects may be ingots or billets. The object may also be a continuous cast plate of a material such as stainless steel.

The illustrated apparatus has two conditioning zones and one intermediate transfer zone. It includes a housing 11 shaped to define a main vacuum chamber 12. Housing 11 is provided at one end with a vacuum lock or chamber 13 and at the opposite end with a vacuum lock or chamber 14 which are provided for entrance and egress of objects to be conditioned in the apparatus, without destroying the vacuum in the main vacuum chamber 12. Suitable vacuum pumping means 12a, 13a, and 14a are connected to respective chambers 12, 13 and 14. Vacuum valves 15, 15a, 15b and 15c are provided between the vacuum locks 13 and 14 and the outside atmosphere and the main vacuum chamber 12. The vacuum valves may be of any suitable type and serve to seal off the vacuum lock during evacuation of the vacuum locks 13 and 14 to the low pressure that is maintained in the high vacuum chamber 12.

The metal slabs, which may or may not be preheated, are passed through the vacuum system on a continuous roller conveyor comprised of support means 16 attached to the sides of housing 11 and between which extend a plurality of driven rollers 17. Pairs of electron guns 18 and 18a and 19 and 19a the details of which will be subsequently explained, are secured to the underside of the top wall of housing 11. Each of guns 18 and 19 produces a beam of electrons of high energy to melt a portion of the object at the surface thereof to a predetermined depth. Each of guns 18 and 19 bombards a respective side of the slab being processed, and the slab is turned over intermediate the guns 18 and 19. Each of the guns 18a and 19a bombard the slab downstream of the guns 18 and 19 to provide hot-topping.

The various positions of the slab being processed are shown in FIGURE 1, the slab being designated by number 21. In the furthest left position, the slab 21 is shown after entering the vacuum lock 13 through vacuum valve 15. The vacuum valve 15 is then closed and the vacuum lock 13 is evacuated to a low pressure by pumping means 13a. The valve 15a is then opened, and the slab 21 is conveyed in the direction of the arrows into the vacuum chamber 12 after which the valve 15a is closed. The slab, moving continuously on the rollers 17, passes under a beam of electrons issuing from the guns 18 and 18a. These beams of electrons produce a molten zone, the depth, temperature width and solidification patterns of which is controlled by controlling the power and density of the electron beam. As the slab 21 moves along underneath the beams of electrons produced by the guns 18 and 18a the molten zone traverses the surface of the slab to eliminate surface imperfections and flaws, and to produce a smoothly solidified surface. Intermediate the guns 18 and 18a and guns 19 and 19a, in a step which may be performed by any conventional handling apparatus (not shown), the slab 21 is inverted and then passed under the beams of electrons issuing from guns 19 and 19a. The molten zone produced by guns 19 and 19a is similar to that produced by guns 18 and 18a and conditions the surface of the slab opposite the surface conditioned by the guns 18 and 18a. Vacuum valve 15b is then opened and the slab 21 then passes therethrough into the vacuum lock 14 which had previously been evacuated to a low pressure by pumping means 14a. The vacuum valve 15b is then closed to isolate the vacuum lock 14 from the main vacuum chamber 12 which is continuously pumped by pumping means 12a. Air is bled into the vacuum lock 14 until the pressure therein reaches atmospheric whereupon the vacuum valve 15c is opened; and the slab 21 is passed out of the vacuum lock 14.

With respect to the surface conditioning of slabs, apparatus operating in accordance with the invention may take numerous forms other than that shown in FIGURE 1. For example, the slab may be removed from the vacuum system halfway through the conditioning cycle and may be turned over in air. In this latter approach, the vacuum system itself may have a much smaller volume, since most of the cross-section thereof need be only slightly greater than that of the largest slab to be handled. The use of vacuum locks 13 and 14 will be desirable in most systems, since they are susceptible of accommodating the wide range of slab sizes which are likely to be encountered in most commercial operations. When the vacuum locks are provided for entrance and egress of the objects to be treated, it is not necessary to pump down the main vacuum chamber 12 each time an object is conditioned. Alternatively to running the slab being conditioned straight through the vacuum system as is shown in FIGURE 1, the slab may be brought in and out of vacuum chamber 12 through the same vacuum lock. In such a case, only one vacuum lock would be required.

Because of vaporization of the molten metal from the surface of the object being conditioned as well as evolution of gas and spray of molten droplets, it is often necessary that the electron guns be hidden from the line of sight of the areas of surfaces being heated in order to prevent accumulation of condensed metal vapors upon the gun structures and in order to prevent instability of operation and impingement of spray against the guns. A particular arrangement for the guns is shown in FIGURES 3, 4, and 5 for use in the apparatus of FIGURE 1. It is to be understood, however, that there are other schemes possible for providing protection of the guns in order to minimize condensation of metal vapors, and the guns need not be placed directly above the surface being conditioned, but rather may be positioned to one side of the surface in accordance with known technology.

The number of guns in the system will vary according to the total power and power distribution requirements.

The gun assembly 18 of FIGURES 3–5 includes a pair of electron gun structures 22 and 23 mounted on the upper surface of a horizontally disposed vapor and spray shield 29 which is suspended from the housing 11 by means of a pair of brackets 31 and 32.

The gun structures 22 and 23 are identical and, consequently, only gun structure 22 will be described in detail. The gun structure 22 includes a backing or focusing electrode 24, a thermionically emissive filament 25, and an accelerating electrode or anode 26. Filament 25 is connected to a suitable filament supply (not shown)

for passing a current through the filament to raise the temperature thereof to that of electron emission. The accelerating electrode 26 is maintained at ground potential, and the filament 25 and backing electrode are maintained at a negative potential by a suitable voltage supply, not shown. The electrons emitted are attracted from the backing electrode 24 in the form of a beam by the accelerating electrode 26. This electron beam is illustrated in dotted line and is shown to be initially directed generally upward from the gun 22.

The beam is curved by the establishment of a magnetic field passing transversely through the beam trajectory. This magnetic field may be established between magnet pole pieces 27 and 28 which may be supported on the brackets 31 and 32. Such pole pieces may be magnetized by means of an electromagnetic coil extending therebetween (not illustrated). The magnetic field produced by pole pieces 27 and 28 is maintained at a constant value and is sufficiently strong to bend the beam of electrons through an arc of approximately 180°.

Figure 2:
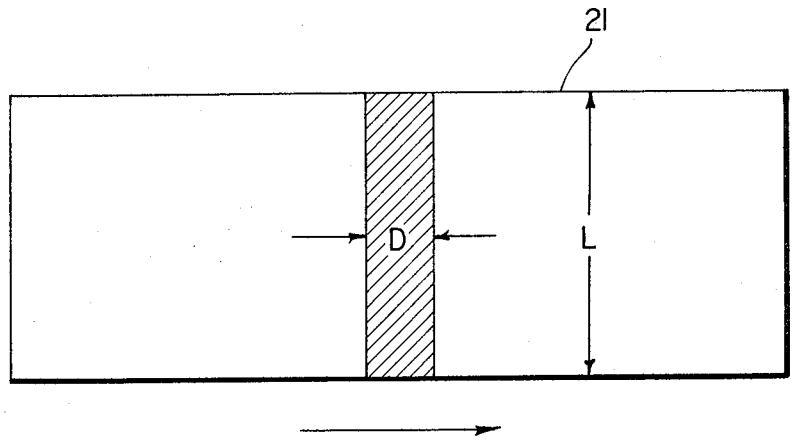
FIGURE 2 is a schematic plan view of a metal slab being conditioned in accordance with the invention.

In order to heat the width of the slab 21 (dimension L of FIGURE 2), the beams emitted from gun structures 22 and 23 are swept across the full width of the surface of the slab which is being conditioned. The sweeping of the beam emitted by gun structure 22 is effected by a pair of pole pieces 33 and 34 disposed on either side of the beam after it is bent by pole pieces 27 and 28. An alternating magnetic field between pole pieces 33 and 34 is produced by means of a suitable coil and AC supply (not shown). This alternating field deflects the beam of electrons and sweeps it across the width of the slab 21 from position A to position B shown in dotted line in FIGURE 4. The beam from electron gun structure 23 is similarly swept such that each of the beams sweeps across the full width of the slab 21. By bending the beam and sweeping it in the manner shown, the electron guns are protected from excessive condensation of vapor and from gases and spray issuing from the melted zone of width D on the surface of slab 21 as shown in FIGURE 2.

In order to confine the molten area on the surface of the slab at the edges thereof, a pair of cooled side rails 35 and 36 are disposed in light contact on either side of the slab 21. Contact may be maintained between the side rails and the slab by conventional means (not shown).

The power and density of the electron beams generated by the electron beam guns in the entire system are controlled to provide the necessary heat for the various phases of the slab conditioning operation. In particular the above-average power density required to make up the heat losses to the side rails may be provided by adjusting the electron beam sweep pattern to give longer residence time to the electron beams in the vicinity of the side rails. Alternatively, additional guns may be provided for this purpose.

There are a number of commercial applications in which the method of the invention may be effectively utilized. Conditioning of specialty alloys of tantalum, columbium, molybdenum, bronze, Kovar and other temperature coefficient alloys, in slab sizes of the order of 2 to 6 inches thick by 8 to 20 inches wide by 2 to 20 feet long is possible. Slabs of high temperature superalloys such as Hastelloy X, Waspaloy, L-605, and Inco 718, in slab sizes of the order to 2 to 6 inches thick by 16 to 36 inches wide by 6 to 40 feet long may be conditioned in accordance with the invention. Stainless steel slabs of various grades in slab sizes of the order of 4 to 7 inches thick by 26 to 68 inches wide by 15 to 40 feet long may also be conditioned in accordance with the invention. Slabs of mild steel for automotive applications, building siding, container stock, and similar uses, which require excellent surface finish, may be also conditioned in accordance with the invention. Such slabs may be of the order of 5 to 8 inches thick by 26 to 84 inches wide by 15 to 40 feet long. High strength steel alloys for subsequent use in plate and sheet form for submarine hulls, pressure vessels, rocket casings, and similar applications, may also be conditioned in accordance with the invention. Such slabs may be of sizes in the order of 8 to 14 inches thick by 72 to 180 inches wide by 15 to 80 feet long.

EXAMPLE I

A slab of stainless steel, type 308, 2½ inches thick, 8 inches wide, and 3 feet long was conditioned on one surface in accordance with the method of the present invention. The stainless steel slab was introduced into a vacuum furnace which was evacuated to a pressure of less than about 0.5 millitorr. The surface of the stainless steel slab was bombarded with an adjacent pair of oscillating electron beams to provide a molten zone having a width of about 6 inches extending transversely over the entire width of the stainless steel slab. One beam provided heat for 3 inches of the molten zone and the other for the remaining 3 inches of the width. The slab was moved transversely in respect to the electron beams at a speed of one foot per minute. The power of the electron beams generating apparatus was regulated to provide about 40 kilowatts of power to the leading beam which provided the melting energy and about 20 kilowatts to the trailing beam which provided the hot-topping energy. Under these conditions, the surface of the stainless steel slab was conditioned to a depth of ¼ inch.

The slab was then removed from the vacuum chamber and examined. It was found that the surface of the slab was free of all surface imperfections; and when the slab was cut in two, it was found that a conditioned layer having an average depth of ¼ inch was formed over substantially the entire top surface of the slab.

EXAMPLE II

A slab of mild steel, suitable for rolling into sheet for the forming of automobile bodies, having a thickness of 7 inches, a width of 12 inches, and a length of 4 feet was treated in accordance with Example 1. The electron beams were regulated to provide a power of about 80 kilowatts and 30 kilowatts to the leading and trailing beams respectively.

The slab was traversed through the beams at a speed of 18 inches per minute. The slab was then turned over, and the opposite surface of the slab was conditioned in a similar manner. After being removed from the vacuum furnace the slab was then cut in two, and it was determined that both surfaces of the slab were provided with a conditioned layer having an average depth of ⅜ inch.

It may therefore be seen that the invention provides an improved method for the surface conditioning of solid metal objects. Surface imperfections and flaws are eliminated by providing a uniform shallow conditioning which can be readily geared for high production rates and which provides a surface of a standard of quality not heretofore attainable. In the case of slabs, the finished surface is smooth enough for immediate introduction into a rolling mill, and the depth of surface fusion may be controlled in accordance with the power density of the electron beams used so that appropriate adjustments can be made for surface quality of the feed material. A negligible amount of material is lost during the operation and the operation may be repeated if necessary. Appropriate electron gun configurations may be utilized to condition almost any shape of feed stock, in addition to the particular types of stock herein shown and discussed.

Various modifications and embodiments of the invention, other than those shown and described herein, will be apparent from the teaching of this specification to those skilled in the art. Such other modifications and embodiments are intended to fall within the scope of the appended claims.

What is claimed is:

1. A method for conditioning a surface of a solid generally planar metal object to eliminate surface and sub-surface defects comprising, passing the object into a vacuum zone, heating substantially the entire width of the exposed surface of the object in said vacuum zone by means of at least one electron beam to melt at least a portion of the exposed surface of the object and form a molten pool extending substantially across the object, confining the molten pool at the edges of the object, controlling the power and density of the electron beam to prevent excessive vaporization of the molten metal and to provide a pool depth which exceeds the depth of the deepest sub-surface defect to be eliminated and which is less than the thickness of the object, and thereafter cooling the object while heating the surface of the molten pool to cause a gradual solidification of the molten pool upwardly from the bottom of the molten pool to produce an object with a dense conditioned surface layer which is free of surface and sub-surface defects.

2. A method in accordance with claim 1 wherein the planar object is moved linearly and wherein the electron beam is swept back and forth transversely to the movement of the object to form a transversely extending molten zone which moves linearly along the surface of the object.

3. A method in accordance with claim 1 wherein after melting and solidification of the exposed surface of the object, the object is inverted within the vacuum zone to expose the opposite surface of the object, heating substantially the entire width of the exposed opposite surface of the object in said vacuum zone by means of at least one electron beam to melt at least a portion of the exposed opposite surface of the object and form a molten pool extending substantially across the object, confining the molten pool at the edges of the object, controlling the power and density of the electron beam to prevent excessive vaporization of the molten metal and to provide a pool depth which exceeds the depth of the deepest sub-surface defect to be eliminated but which is less than the thickness of the object, and thereafter cooling the object while heating the surface of the molten pool to cause a gradual solidification of the molten pool upwardly from the bottom of the molten pool to produce an object with dense conditioned surface layers which are free of surface and sub-surface defects.

References Cited

UNITED STATES PATENTS

| | | | |
|---|---|---|---|
| 2,816,231 | 12/1957 | Nygard | 219—121 |
| 3,050,616 | 8/1962 | Gage | 219—69 |
| 3,134,892 | 5/1964 | Opitz et al. | 219—121 |
| 3,210,518 | 10/1965 | Morley et al. | 219—121 |
| 3,235,647 | 2/1966 | Hanks | 219—121 |
| 3,336,460 | 8/1967 | Hauck et al. | 219—123 |
| 2,989,614 | 6/1961 | Steigerwald | 219—121 |
| 3,177,535 | 4/1965 | Hanks | 13—31 |
| 3,211,886 | 10/1965 | Barkan et al. | 219—121 |
| 3,258,577 | 6/1966 | Smith | 219—125 |
| 3,303,320 | 2/1967 | Muller | 219—121 |
| 3,325,620 | 6/1967 | Hunt et al. | 219—121 |
| 3,343,828 | 9/1967 | Hunt | 13—31 |
| 3,352,997 | 11/1967 | Butler | 219—121 |
| 3,364,296 | 1/1968 | Smith | 13—31 |

JOSEPH V. TRUHE, Primary Examiner

W. DEXTER BROOKS, Assistant Examiner